US006328068B1

(12) United States Patent
Jacobson

(10) Patent No.: US 6,328,068 B1
(45) Date of Patent: Dec. 11, 2001

(54) PUSH-PULL COUPLING

(75) Inventor: Robert David Jacobson, St. Paul, MN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/566,975

(22) Filed: May 9, 2000

(51) Int. Cl.[7] ..................................................... F16K 35/00

(52) U.S. Cl. ......................... 137/625.69; 74/110; 251/89; 251/294

(58) Field of Search ......................... 74/110; 137/625.69; 251/89, 294

(56) References Cited

U.S. PATENT DOCUMENTS 4,019,602 4/1977 Habiger .

*Primary Examiner*—Gerald A. Michalsky
(74) *Attorney, Agent, or Firm*—Millen, White, Zelano & Branigan, P.C.

(57) ABSTRACT

A push-pull coupling for coupling a valve spool to a coaxial cable includes a lost-motion connection which operatively disconnects the coaxial cable from the valve spool when in a first mode and positively connects the coaxial cable to the valve spool when in a second mode. Switching from the first mode to the second mode is accomplished by energizing an electromagnetic actuator within the coupling which locks components to one another to transmit push and pull motion. When the actuator is deenergized, the components move relative to one another, disconnecting the coaxial cable from the valve spool. The push-pull coupling is used in hydraulic machines to prevent operation of hydraulic cylinders when a driver is not seated on the machine so as to close a seat operated switch which energizes the electromagnetic actuator.

12 Claims, 6 Drawing Sheets

PUSH-PULL COUPLING

FIELD OF THE INVENTION

The present invention is directed to a push-pull coupling. More particularly, the present invention is directed to a push-pull coupling adapted to connect an operator to a device in both a push and a pull direction as well as to mechanically disconnect the operator from the device.

BACKGROUND OF THE INVENTION

It is frequently necessary or desirable to selectively couple and uncouple an operator from a device. A particular application of this coupling need is in hydraulic machines such as skid-steer loaders and other hydraulic devices which may have other functions, such as but not limited to, street sweepers, ground boring machines, bull dozers, graders and earth scoopers. It is necessary to enable hydraulic systems, such as hydraulic lifts, only when a person is seated on the machine. In the past, this has been done by a solenoid operated lock pin which prevents operation of a valve spool by engaging a groove in the spool to retain the spool in a neutral position. Due to tolerance stack-ups, if an operating lever is pushed hard enough, the device can receive a small amount of oil and creep instead of remaining in position. Moreover, this type of solenoid spool lock requires that the operating handle be returned to neutral before the lock pin re-engages the groove in the spool. This leads to dangerous conditions in which the hydraulic device moves or operates when the lock pin should be engaged. A primary drawback of the solenoid projected lock pin is that the operating handle is always positively connected to the spool and will apply a longitudinal force to the spool whenever the actuating lever is pushed or pulled. It is therefore necessary to rely on the interference of the lock pin in order to prevent operation of the hydraulic device.

Hydraulic machines are exemplary of devices having safety features which disabled the machines under certain circumstances. There are numerous other devices which employ safety devices that have drawbacks which may be similar, analogous or in addition to the afore-discussed drawbacks of solenoid operated locking pins.

The difficulties are especially acute when it is necessary to prevent the operation of a device which moves in both directions, i.e., a device which is both pushed and pulled during its operation.

In view of these and other considerations, there is a need for improving the reliability and safety of devices which utilize push-pull operators.

SUMMARY OF THE INVENTION

The present invention relates to a push-pull coupling adapted to connect an operator to a device for moving the device in both push and pull directions. The invention comprises a body having first and second ends. A rod is disposed at the first end of the body and is mounted for slidable movement with respect to the body in both the push and pull directions, the rod being adapted to positively connect to the operator. A connector is located at the second end of the body and is adapted to positively connect the body to the device. A lost motion connection is disposed between the rod and the connector. The lost motion connection has a first mode in which there is a de-coupling of the rod to the connector resulting in lost mechanical motion in both the push and pull directions. The lost motion connection further has a second mode in which there is a positive coupling between the rod and the connector, wherein motion of the rod is transmitted to the connector. An electromagnetic actuator is associated with the lost motion connection for maintaining the lost motion connection in the first mode when deenergized and for maintaining the lost motion connection in the second mode when energized.

In a more specific aspect, the lost motion connection of the push-pull coupling includes first and second armatures. The first armature is positively connected to the push-pull rod only when the rod is pulled and is disconnected from the rod when the rod is pushed. The second armature is positively connected to the push-pull rod when the rod is pushed and disconnected from the rod when the rod is pulled. The electromagnetic actuator functions to disconnect both armatures from the body when in the first mode and for connecting both armatures to the body when in the second mode by applying electric current to electromagnets disposed within the body.

In a further aspect of the invention, first and second springs are provided for biasing armatures to the first positions in which the armatures are disconnectable from the coils of the electromagnets when the electromagnetic actuator is in the first mode and wherein the armatures positively couple with the coils when the electromagnetic actuator is in the second mode, whereby the armatures are disconnected from the body when the lost motion connection is in the first mode and are positively connected to the body when the lost motion connection is in the second mode.

In a still further aspect of the invention, the body is in the form of a housing having a connector at one end, and the push-pull rod at the other end with the armatures, electromagnets and springs disposed within the body.

In one application of the invention, the push-pull coupling is disposed between the spool of a hydraulic valve and an operator for that valve and enables reciprocation of the spool within the valve only when the electromagnetic actuator is energized, thus providing a safety device which in a specific aspect enables reciprocation of the spool only when the person operating the valve is correctly positioned to manipulate the operator, such as being seated on a seat which closes a switch that energizes the electromagnetic operator.

DETAILED DESCRIPTION

Figure 1:
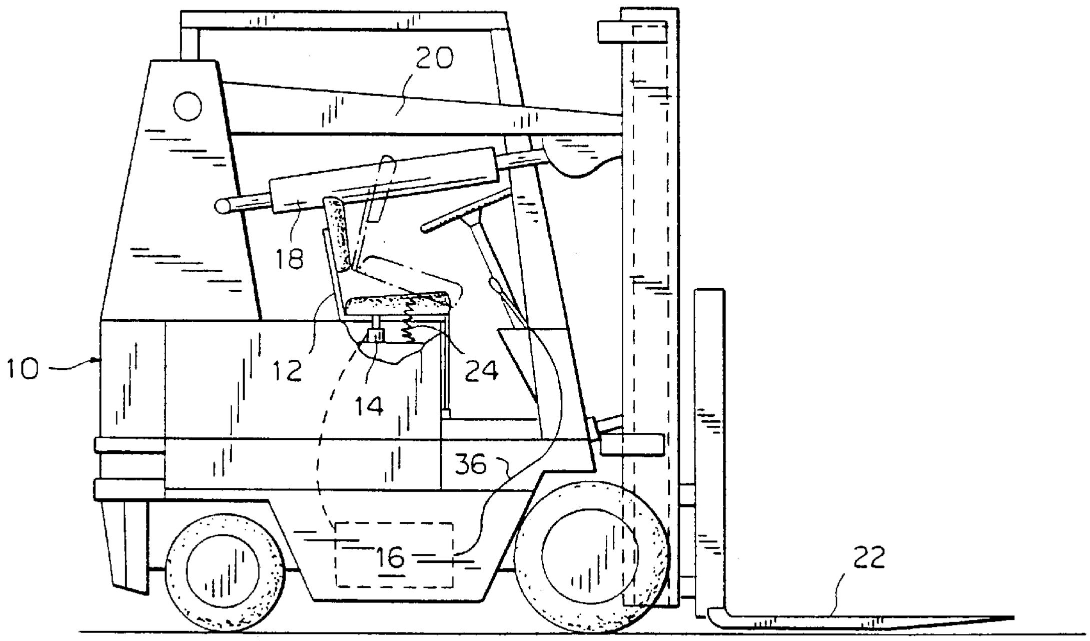
FIG. 1 is a side view of a machine such as a skid-steer loader which employs a push-pull coupling configured in accordance with the present invention.

Referring now to FIG. 1, there is shown a device such as a skid steer loader 10 which includes a seat 12, a seat operated switch 14, a control valve 16 which is enabled for operation by the seat switch 14, and a device such as a hydraulic cylinder 18 which is driven by fluid dispensed by the valve 16. When the hydraulic cylinder 18 is activated, it raises and lowers a boom 20 in order to perform functions such as raising and lowering a forklift, such as a forklift 22, or operating a loader bucket, street broom, boring tool, or dozer blader (none of which are shown). Flow of fluid to the hydraulic cylinder 18 is controlled by an operating lever 24 mounted on the skid-steer loader 10 adjacent the seat 12.

Figure 2:
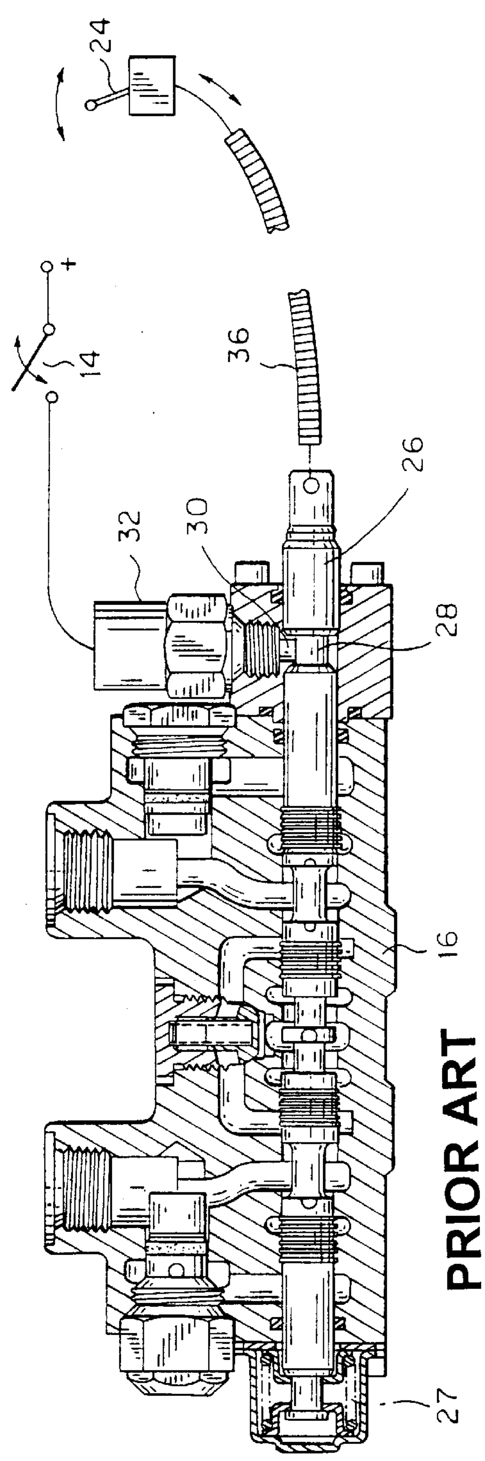
FIG. 2 is a side elevation of a valve utilizing a solenoid operated lock pin in accordance with the prior art.

Referring now to the prior art arrangement of FIG. 2, it is seen that the operating valve 16 has a spool 26 that is biased to a neutral position by a coil spring 27. The spool 26 is engaged by a locking pin 30 that is reciprocated in a radial direction by a solenoid 32. Normally, the locking pin 30 is spring projected into the groove 28, however, when a person operating the machine 10 sits on the seat 12, a switch 14 closes which energizes the solenoid 32. The solenoid 32 then overcomes the bias of the spring projecting the locking pin 30 and the locking pin is withdrawn from the groove 28. This permits the spool 26 to be moved in a longitudinal direction by an operator in the form of a coaxial cable 36 that is attached to the handle 24. In accordance with the present invention, solenoid operated lock 32 is replaced with a push-pull coupling 40 which is shown in FIGS. 3–7.

Figure 3:
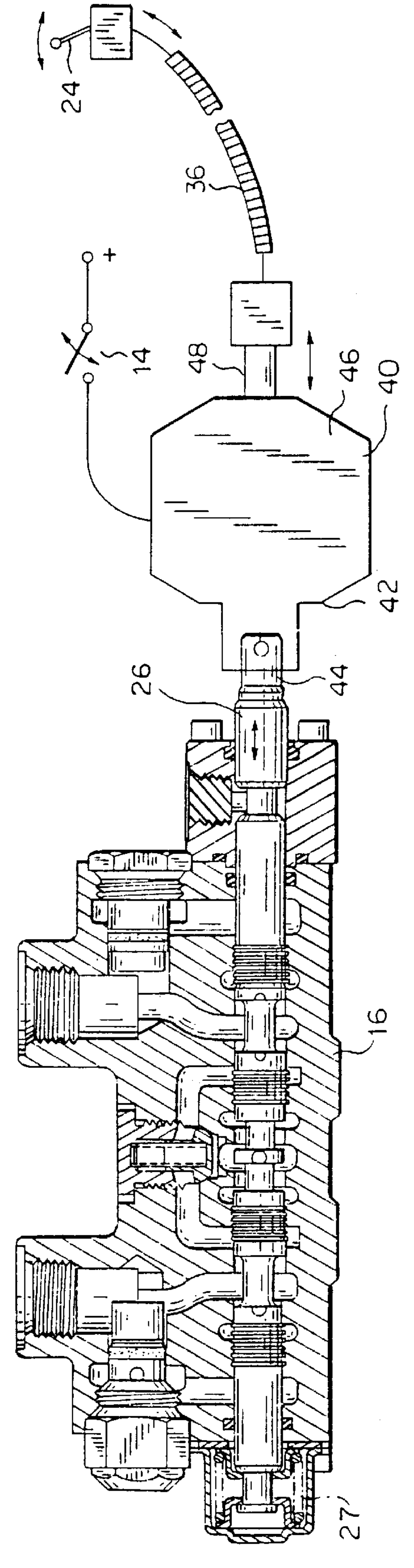
FIG. 3 is a side elevation of a valve having a valve spool coupled to a push-pull cable utilizing a push-pull coupling configured in accordance with the principles of the present invention.

Referring now to FIG. 3, the push-pull coupling 40 has a first end 42 which is coupled directly to an end 44 of the valve spool 26 and a second end 46 which is connected to a push-pull rod 48 which is in turn directly connected to the coaxial cable 36. In accordance with the present invention, when the push-pull coupling 40 is in a first mode, there is lost motion between the push-pull rod 48 and the end 44 of the spool 26, disabling operation of the valve spool by the coaxial cable 36. When the push-pull coupling 40 is in a second mode, there is a positive connection between the push-pull rod 48 and the end 44 of the valve spool 26 wherein when the coaxial cable 36 is either pushed or pulled, the valve 26 moves longitudinally with the cable because there is no lost motion.

Figure 4:
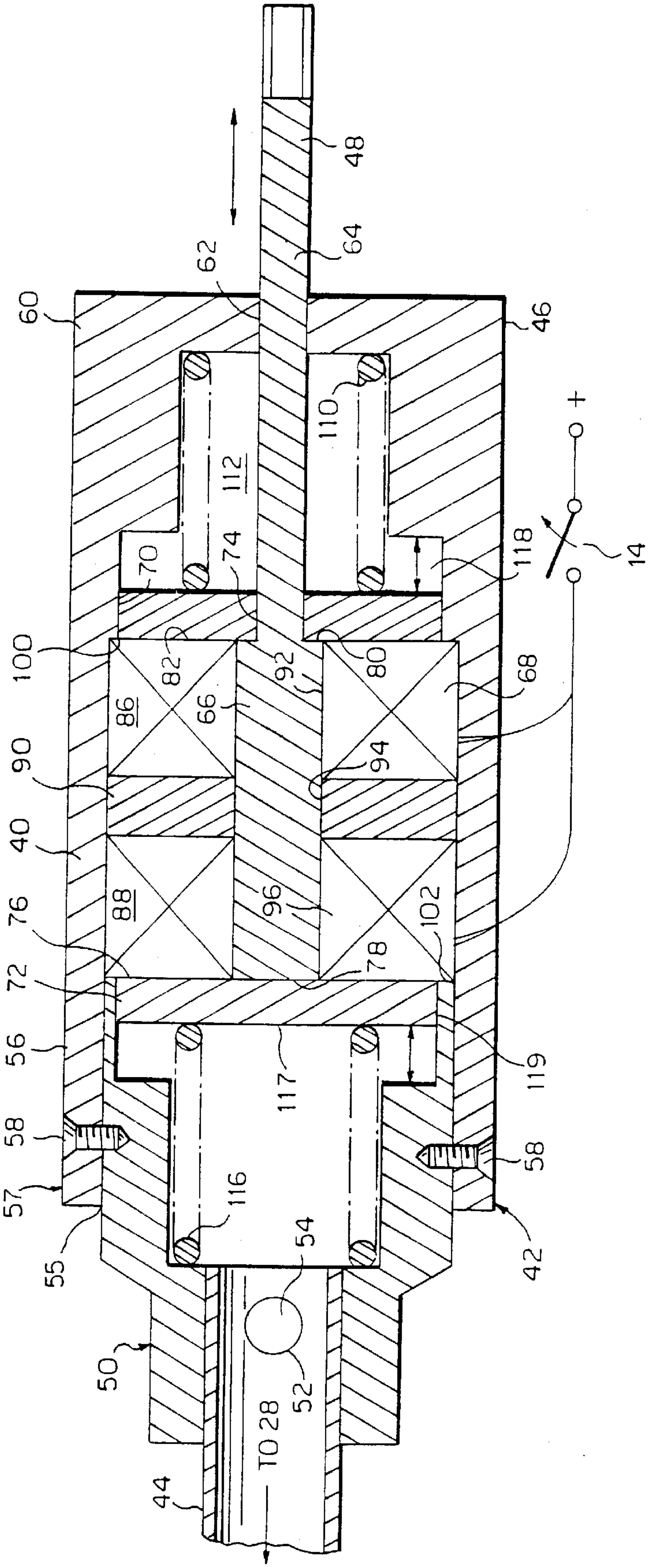
FIG. 4 is a side elevation of the coupling in accordance with the prevent invention showing electromagnets utilized in the present invention in a deenergized state with a push-pull operating cable not being operated.

Referring now to FIG. 4, where the push-pull coupling 40 is shown in detail, it is seen that the first end 42 of the push-pull coupling includes a connector in the form of a lug 50 which has a hole 52 therethrough which receives a pin or bolt 54 for positively connecting the lug to the end 44 of the spool 26. The lug 50 is retained within a first end 56 of a housing and is rigidly retained therein by screws 58 to form an integral body 57. The housing 56 has a second end 60 having an opening therethrough 62 which receives a small diameter portion 64 of the rod 48 and allows the rod 48 to reciprocate within and with respect to the housing 56. The push-pull rod 48 has a second portion 66 which has a relatively large diameter and is positioned within a chamber 68 defined by the housing 56.

Within the chamber 68 of the housing 56, there is a first armature 70 and a second armature 72. The first armature 70 has a central opening 74 extending completely therethrough which slidably receives the narrow diameter portion 68 of the push-pull rod 48. The second armature 72 has a flat rear face 76, which abutted by a flat end face 78 of the relatively wide portion 66 of the push-pull rod 48. The relatively wide portion 66 of the push-pull rod 48 also defines a rear shoulder 80 which abuts a front face 82 of the armature 70. Consequently, the push-pull rod 48 is not positively connected to the rear face 76 of the second armature 72 because it can be pulled away from the rear face 76. Moreover, the rod 48 is not positively connected to the front face 82 of the first armature 70 because it can be pushed away from the front face.

Disposed within the cavity 68 of the housing 40 is a first annular coil 86 and a second annular coil 88. These coils are separated by a spacer 90. Both the coils 86 and 88 and the spacer 90 have hollow bores 92, 94 and 96 extending therethrough through which the large diameter portion 66 of the push-pull rod 48 is slidably received. The coil 86 is held in abutment with a shoulder 100 within the chamber 68 of the housing 56 by the spacer 90 while the coil 88 is held in abutment with the spacer 90 by a shoulder 102 at the end of the lug member 50. Consequently, the coils 86 and 88 are locked within the housing 56 so as not to move longitudinally or radially with respect to the body 57 which is comprised of the housing 56 and the lug member 50.

A first coil spring 110 is seated within a cavity 112 at the first end 60 of the housing 56 and biases the first armature 70 against the first coil 86. The coil spring 110 also biases the end face 78 of the enlarged portion 66 of the push-pull rod 48 towards the end face 76 of the second armature 72. A second coil spring 116 engages the front end face 117 of the second armature 72 and urges the second armature against the second coil 88 as well as against the end face 78 of the enlarged portion 66 of the push-push rod 48. When the first coil 86 and the second coil 88 are not energized, the first armature 70 and second armature 72 are free to displace axially through gaps 118 and 119 from the first and second coils upon overcoming the bias of the first and second springs 110 and 116. This is shown in FIGS. 5 and 6.

Figure 5:
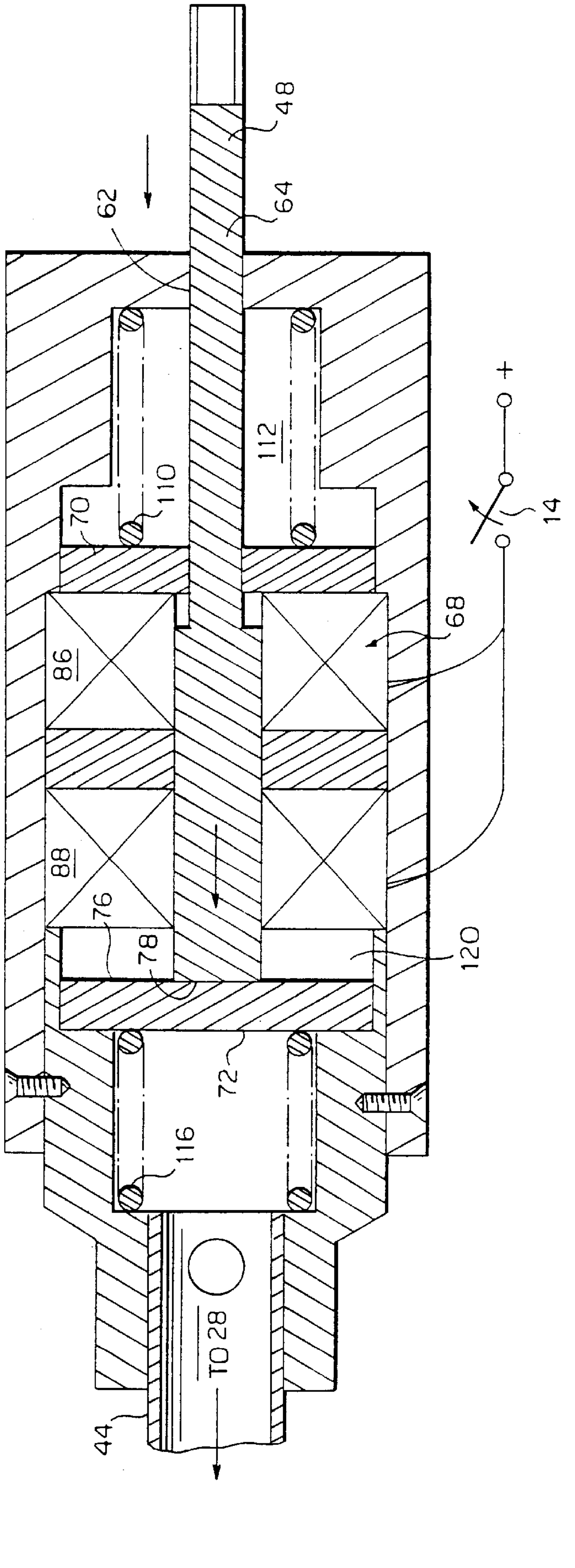
FIG. 5 is a view similar to FIG. 4 with the electromagnetics in a deenergized state and showing the push-pull cable pushing toward the coupling.

Referring now to FIG. 5, when the push-pull rod 48 is pushed and the coils 86 and 88 are deenergized, the large portion 66 of the push-pull rod moves to the left and pushes the second armature 72 against the bias of the spring 116 and away from the second coil 88 as is seen by the gap 120. Thus, the push motion on the push-pull rod 48 is lost and the spool 26 (see FIG. 3) is not moved. The first armature 70 remains stationary because the spring 110 biases it against the first coil 86.

Figure 6:
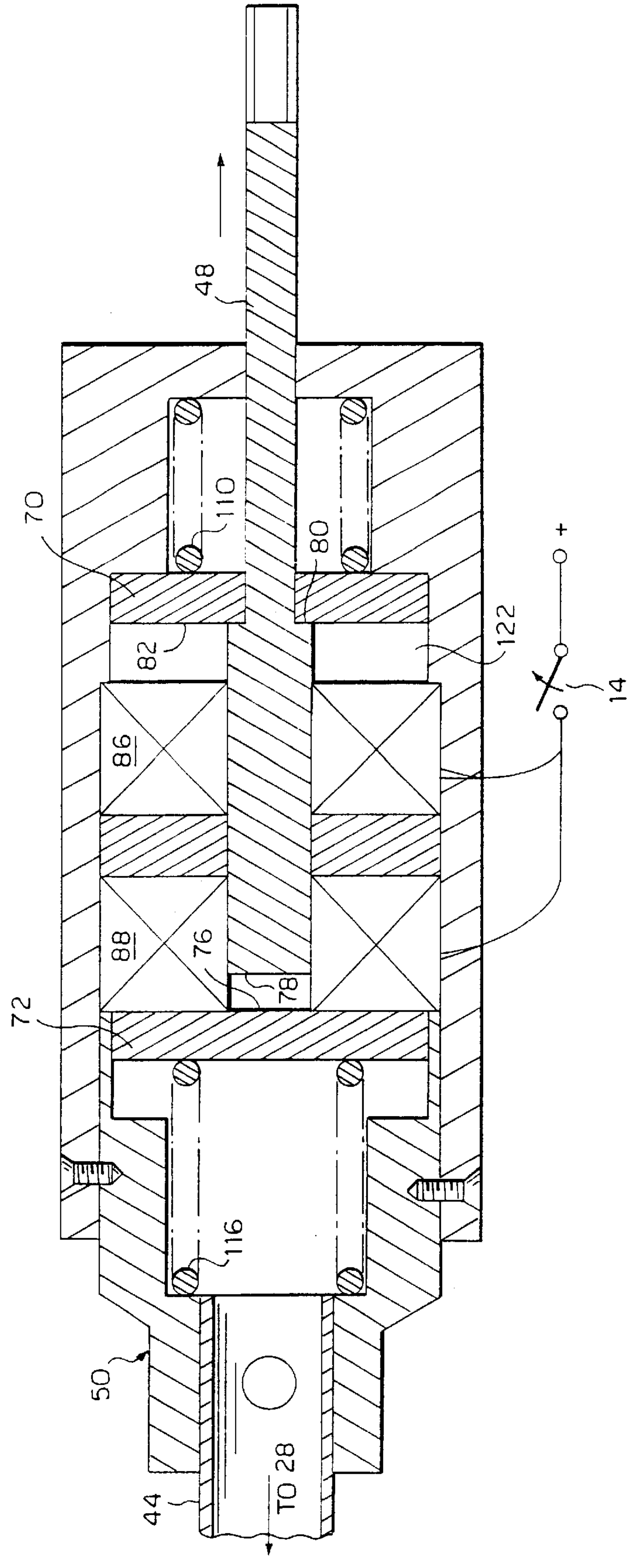
FIG. 6 is a view similar to FIG. 5 showing the electromagnetics in a deenergized state and showing a push-pull cable being pulled away from the coupling.

Referring now to FIG. 6, when the push-pull rod 48 is pulled, the first armature 70 moves against the bias of spring 110 and compresses spring 110 because the rear surface 80 of the enlarged portion 66 of push-pull rod 48 bears against the front surface 82 of the first armature pulling the first armature away from the first coil 86. Thus there is a lost motion indicated by the gap 122 between the coil 86 and the front face 82 of the first armature 70. Consequently, the spool 26 of the valve 16 is not pulled back upon pulling on the coaxial cable 36 with the handle 14.

The phenomenon of FIGS. 5 and 6 illustrates that there is a lost motion connection in both the push and pull directions within the body 57 of the push-pull coupling 40 when the coupling is in a first mode due to the coils 86 and 88 being deenergized. In the embodiment of the invention exemplifying a use in a hydraulic machine, the lost motion connection occurs when a person is not sitting on the seat 12 to close the switch 14 in order to energize the coils 86 and 88.

Figure 7:
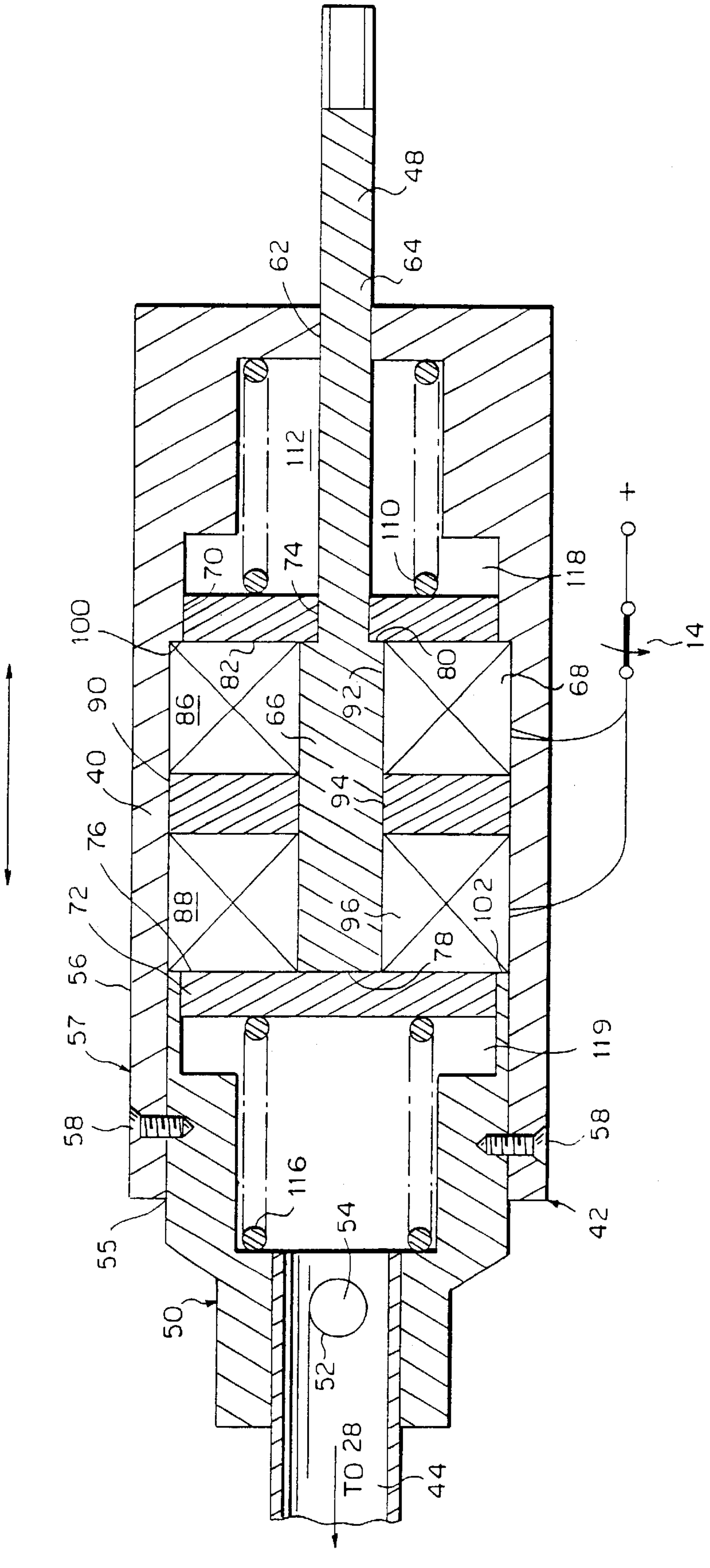
FIG. 7 is a view similar to FIGS. 4–6 showing the electromagnets within the push-pull coupling in an energized state so that the push-pull coupling has no lost motion and moves concurrently with the operating cable in order to reciprocate the spool of the valve with which it is connected.

Referring now to FIG. 7, when in the exemplary embodiment, a person sits on the seat 12, the switch 14 is closed thereby energizing the electromagnets 86 and 88. The first and second armatures 70 and 72 are then magnetically held against the coils 86 and 88 creating a rigid assembly of the body 57 with no lost motion. A pushing motion on the coaxial cable 36 from the lever 14 moves the push-pull rod 48 and the lug 52 to push the valve spool 26 within the valve housing toward the left against the bias of coil spring 27 (see FIG. 3). This causes the valve to operate the hydraulic device associated therewith, by allowing hydraulic fluid to flow thereto so as to operate for example the hydraulic cylinder 18 of FIG. 1. When the coaxial cable 36 is pulled, the valve spool 26 moves to the right against the bias of coil spring 27, again because the body 57 becomes a rigid assembly when both coils 86 and 88 are energized (see FIG. 3). When the seat 12 becomes unoccupied, the switch 14 interrupts current to the coils 86 and 88 and lost motion within the body 57 allows the spring 27 to return the spool 26 to its neutral position.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

I claim:

1. A push-pull coupling adapted to connect an operator to a device for moving the device in both push and pull directions, comprising:

a body having a first end and a second end;

a rod disposed at the first end of the body and being mounted for slidable movement with respect to the body in both the push and pull directions, the rod adapted to positively connect to the operator;

a connector at the second end of the body adapted to positively connect the body to the device;

a lost motion connection disposed between the rod and the connector; the lost motion connection having a first mode in which there is a decoupling of the rod from the connector resulting in lost mechanical motion in both the push and pull directions, and a second mode in which there is a positive coupling between the rod and the connector, wherein motion of the rod is transmitted to the connector, and an electromagnetic actuator associated with the lost motion connection for maintaining the lost-motion connection in the first mode when the actuator deenergized and for negating the lost motion connection and switching the lost motion connection to in the second mode when the actuator is energized, whereby the coupling operatively connects the operator to the device only when the actuator is energized.

2. The push-pull coupling of claim 1 wherein the lost motion connection includes first and second armatures, the first armature being positively connected to the push-pull rod only when the rod is pulled and disconnected from the rod when the rod is pushed and the second armature being positively connected to the rod when the rod is pushed and disconnected from the rod when the rod is pulled, wherein the electromagnetic actuator disconnects both armatures from the body when in the first mode and connects both armatures to the body when in the second mode.

3. The push-pull coupling of claim 2, further including first and second springs for biasing the armatures to first positions in which the armatures positively couple with coils when the electromagnetic actuator is in the first mode and are disconnectable form the coils when the actuator is in the second mode, whereby the armatures are operatively disconnected from the body when the lost motion connection is in the first mode and positively connected to the body when the lost motion connection is in the second mode.

4. The push-pull coupling of claim 2, further including first and second springs within the body for biasing the armatures to first positions in which the armatures positively couple with coils when the electromagnetic actuator is in the first mode and are disconnectable form the coils when the actuator is in the second mode, whereby the armatures are operatively disconnected from the body when the lost motion connection is in the first mode and positively connected to the body when the lost motion connection is in the second mode.

5. A push-pull coupling connecting a push pull linkage a valve spool for moving a device in both push and pull directions within a valve, comprising:

a body having a first end and a second end;

a rod disposed at the first end of the body and being mounted for slidable movement with respect to the body in both the push and pull directions, the rod adapted to positively connect to the push pull linkage;

a connector at the second end of the body adapted to positively connect the body to the valve spool;

a lost motion connection disposed between the rod and the connector; the lost motion connection having a first mode in which there is a disabling of the rod from the connector resulting in lost mechanical motion in both the push and pull directions, and a second mode in which there is a positive coupling between the rod and the connector, wherein motion of the rod is transmitted to the connector, and an electromagnetic actuator associated with the lost motion connection for maintaining the lost-motion connection in the first mode when the actuator is deenergized and for negating the lost motion connection and switching the lost motion connection to the second mode when the actuator is energized, whereby the coupling operatively connects the operator to the device only when the actuator is energized.

6. The push-pull coupling of claim 5 wherein the lost motion connection includes first and second armatures, the first armature being positively connected to the push-pull rod only when the rod is pulled and disconnected from the rod when the rod is pushed and the second armature being positively connected to the rod when the rod is pushed and disconnected from the rod when the rod is pulled, wherein the electromagnetic actuator disconnects both armatures from the body when in the first mode and connects both armatures to the body when in the second mode.

7. The push-pull coupling of claim 4, further including first and second springs for biasing the armatures to first positions in which the armatures positively couple with coils when the electromagnetic actuator is in the first mode and are disconnectable form the coils when the actuator is in the second mode, whereby the armatures are operatively disconnected from the body when the lost motion connection is in the first mode and positively connected to the body when the lost motion connection is in the second mode.

8. The push-pull coupling of claim 7 wherein the linkage is a coaxial cable.

9. The push-pull coupling of claim 8 further including a seat operated switch for closing to energize the actuator when the seat is occupied and for opening to deenergize the actuator when the seat is unoccupied.

10. The push-pull coupling of claim 9 wherein the valve is adapted to be connected to power a hydraulic operator in a hydraulic machine.

11. A push-pull coupling adapted to connect an operator to a device for moving the device in both push and pull directions, comprising:

a housing having a first end and a second end;

a rod disposed at the first end of the housing and being mounted for slidable movement with respect to the housing in both the push and pull directions, the rod adapted to positively connect to the operator;

a connector fixed to the second end of the housing to form a body adapted to positively connect to the device;

a lost motion connection disposed in the housing between the rod and the connector; the lost motion connection having a first mode in which there is a decoupling of the rod from the connector resulting in lost mechanical motion in both the push and pull directions, and a second mode in which there is a positive coupling between the rod and the connector, wherein motion of the rod is transmitted to the connector, and an electromagnetic actuator within the housing and associated with the lost motion connection for maintaining the lost-motion connection in the first mode when the actuator is deenergized and for negating the lost motion connection and switching the lost motion connection to in the second mode when the actuator is energized, whereby the coupling operatively connects the operator to the device only when the actuator is energized.

12. The push-pull coupling of claim 11 wherein the lost motion connection includes first and second armatures, the first armature being positively connected to the push-pull rod by a shoulder on the rod only when the rod is pulled and disconnected from the rod when the rod is pushed and the second armature being positively connected to the rod by an end face on the rod when the rod is pushed and disconnected from the rod when the rod is pulled, wherein the electromagnetic actuator disconnects both armatures from the body when in the first mode and positively connects both armatures to the body when in the second mode.

* * * * *

UNITED STATES PATENT AND TRADEMARK OFFICE

CERTIFICATE OF CORRECTION

PATENT NO. : 6,328,068 B1
DATED : December 11, 2001
INVENTOR(S) : Jacobson

It is certified that error appears in the above-identified patent and that said Letters Patent is hereby corrected as shown below:

Column 6,
Lines 5, 14 and 61, reads “disconnectable form” should read -- disconnectable from --;
Line 20, reads “linkage a”, should read -- Linkage with a --
Line 57, reads “of claim 4,” should read -- of claim 6, --

Signed and Sealed this

Twenty-sixth Day of April, 2005

JON W. DUDAS
*Director of the United States Patent and Trademark Office*